United States Patent [19]

Sayigh et al.

[11] 3,711,244
[45] Jan. 16, 1973

[54] SULFONAZIDE BONDING OF POLYMERIC DYES ON POLYAMIDE, POLYESTER OR POLYOLEFIN UNDER RADIATION

[75] Inventors: Adnan A. Sayigh; Fred A. Stuber, both of North Haven; Henri Ulrich, North Branford, all of Conn.

[73] Assignee: The Upjohn Company, Kalamazoo, Mich.

[22] Filed: Nov. 27, 1970

[21] Appl. No.: 93,503

Related U.S. Application Data

[63] Continuation-in-part of Ser. No. 15,838, March 2, 1970, abandoned.

[52] U.S. Cl. ........................8/2, 8/31, 8/DIG.7
[51] Int. Cl. ........................................................D06p
[58] Field of Search............8/DIG. 7, 10, 163, 2, 31; 96/49

[56] References Cited

UNITED STATES PATENTS

| | | | |
|---|---|---|---|
| 3,562,269 | 2/1971 | Ulrich | 260/248 NS |
| 3,058,944 | 10/1962 | Breslow | 260/341 |
| 3,337,288 | 10/1967 | Horiguchi | 8/DIG. 7 |
| 3,462,268 | 8/1969 | Danhauser | 260/349 |
| 2,887,376 | 5/1959 | Tupis | 96/35.1 |
| 3,536,490 | 10/1970 | Hochberg | 96/47 |

FOREIGN PATENTS OR APPLICATIONS

952,810  3/1964  Great Britain..................8/DIG.7

Primary Examiner—Donald Levy
Attorney—Denis A. Firth and John Kekich

[57] ABSTRACT

Polymeric dyestuffs are bonded to substrates containing a plurality of C—H bonds (polyolefins such as polyethylene preferred) by applying the polymeric dyestuffs in association with certain sulfonazides as a coating to the substrate and exposing the coated substrate to irradiation (thermal or actinic). The sulfonazides used have the formulas:

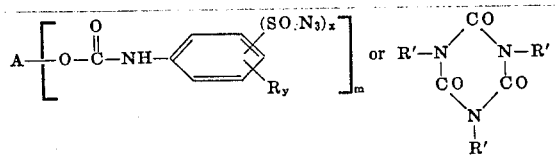

wherein A is the residue of an aliphatic alcohol containing $m$ hydroxyl groups and a molecular weight less than 300, $m$ is 1 to 6, R is lower-alkyl or halogen, $x$ is 1 to 2, $y$ is 0 to 2, provided that $x + y$ is 3, and further provided that $m$ is at least 2 when $x$ is 1, the $SO_2N_3$ groups are in positions 3, 4, or 5 of the benzene nuclei and one of said positions is unsubstituted and $R' =$

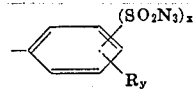

The irradiation can be carried out imagewise so as to reproduce images, e.g. illustrations, printed wording etc. on the substrate, said image being developed by washing out the unexposed unbonded polymeric dyestuff.

11 Claims, No Drawings

1

SULFONAZIDE BONDING OF POLYMERIC DYES ON POLYAMIDE, POLYESTER OR POLYOLEFIN UNDER RADIATION

CROSS-REFERENCE TO RELATED APPLICATION

This application is a continuation-in-part of our copending application Ser. No. 15,838, filed Mar. 2, 1970, now abandoned.

BACKGROUND OF THE INVENTION

1. Field of the Invention

This invention relates to processes for bonding polymeric dyestuffs to substrates and is more particularly concerned with processes for chemically bonding polymeric dyestuffs to substrates containing a plurality of C—H bonds and with coated substrates so produced.

2. Background of the Invention

The bonding of dyestuffs to certain substrates, particularly those containing a plurality of C—H bonds and no other reactive groups, has been a problem in the art. This has made it difficult to apply permanently bonded coatings to said substrates, or to print, or otherwise reproduce, colored images on said substrates. For example, polyethylene and like polyolefins, which are widely used in film form in the wrapping and packaging arts cannot be coated permanently with advertising and like printed or illustrating matter. Means to promote the application of coating to such substrates, e.g. by exposure of said substrates to corona discharge prior to application of the coating, have proved only partially successful and are attended by high cost of operation.

We have now found that colored coatings, either in the form of continuous films or in the form of images, can be applied to substrates containing a plurality of C—H bonds and can be bonded chemically thereto using a novel process to be described herein.

SUMMARY OF THE INVENTION

This invention comprises a process for chemically bonding a polymeric dyestuff to a substrate containing a plurality of C—H bonds which process comprises the steps of:

a. applying to said substrate a coating comprising a polymeric dyestuff and from 1 percent to 15 percent by weight, based on said polymeric dyestuff, of a sulfonazide selected from the class consisting of sulfonazides having the formulas:

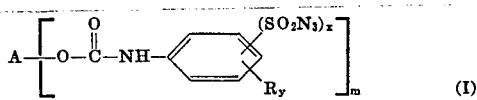
(I)

and

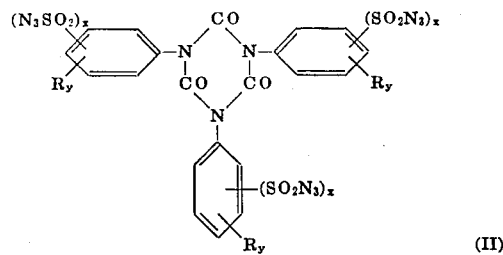
(II)

wherein A is the residue of a saturated aliphatic alcohol having $m$ hydroxyl groups and a molecular weight less than 300, $m$ is an integer from 1 to 6, R is selected from the class consisting of lower-alkyl and halogen, $x$ is an integer from 1 to 2, $y$ is an integer from 0 to 2, provided that the sum of $x + y$ is not greater than 3, and further provided that $m$ is at least 2 when $x$ is 1, the $SO_2N_3$ groups are attached at positions 3, 4, or 5 and R is attached in any otherwise unsubstituted position, provided that at least one of positions 3, 4, or 5 in each benzene ring is unsubstituted; and b. exposing said coated substrate to a source of irradiation necessary to activate said sulfonazide and thereby effect chemical bonding of said polymeric dye to said substrate.

The term "polymeric dyestuff" means a polymer having pendant dye molecules distributed throughout the polymeric chain, as will be discussed and exemplified more fully hereinafter.

The term "residue of a saturated aliphatic alcohol having $m$ hydroxyl groups and a molecular weight less than 300" as used herein means the aliphatic moiety remaining after removal of all the hydroxyl groups from an aliphatic alcohol having the defined qualifications. Examples of such alcohols are ethanol, propanol, hexanol, octanol, ethylene glycol, 1,2-propylene glycol, hexane-2,3-diol, hexane-1,2,3-triol, glycerol, trimethylolethane, trimethylol-propane, erythritol, pentaerythritol, mannitol, glucose and the like.

The term "lower-alkyl" as used herein means alkyl of from one to six carbon atoms, inclusive, and is inclusive of methyl, ethyl, propyl, butyl, pentyl, hexyl, and isomeric forms thereof. The term "halogen" as used herein is employed in its conventionally accepted sense as inclusive of chlorine, bromine, fluorine, and iodine.

DETAILED DESCRIPTION OF THE INVENTION

The polymeric dyestuffs which are employed in the process of the invention are polymers in which there is present a plurality of dyestuff moieties pendant from the polymer chain as is illustrated by the following schematic representation:

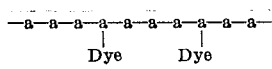

wherein "$a$" represents the recurring unit of the polymer chain and "Dye" represents the radical derived from the dyestuff molecule. The polymeric dyes are obtained either (a) by polymerizing a polymerizable monomer to which the dyestuff moiety has already been attached or (b) by incorporating the dyestuff moiety into the preformed polymer.

Illustrative of method (a) is the procedure in which acryloyl chloride, methacryloyl chloride, or like unsaturated acid halides having a CH₂ group therein, are reacted with a dyestuff containing a primary or secondary amino group or a free hydroxyl group to give the corresponding N-acryloyl or N-methacryloyl derivative of the dyestuff. The polymerizable monomer so obtained is then polymerized, or copolymerized in association with one or more different copolymerizable monomers such as vinyl chloride, vinyl acetate and the like to give a polymer containing dyestuff moiety in each recurring unit.

The reactive dyestuffs which can be employed to form polymeric dyestuffs in accordance with the above process can be any of the basic dyestuffs, listed in Color Index, Second Edition, Vol. 1, pages 1617–1653, 1956, published jointly by The Society of Dyers and Colorists, Bradford, Yorkshire, England, and The American Association of Textile Chemists and Colorists, Lowell, Massachusetts, which dyestuff contains a primary or secondary amino group. Typical of said dyestuffs are crystal violet, methylene blue, malachite green, auramine 0, basic fuchsin, Aniline Yellow, Disperse Orange 3, Disperse Black 7, Disperse Red 13, Disperse Red 9, Vat Red 33, Mordant Violet 6, Phenylene blue, Disperse Orange 11, Natural Orange 6, Natural Brown 7, and Natural Yellow 12.

In preparing polymeric dyestuffs in accordance with method (b) described above a preformed polymer is employed which contains in the recurring unit a group which is reactive chemically with a dyestuff moiety or which can be modified readily to provide a such a reactive group. Illustrative of such preformed polymers are the polyacrylates, polymethacrylates and the like in which the recurring unit is a carboxylic acid moiety, or a carboxylic acid ester moiety which can be hydrolyzed to give a free carboxylic moiety, which free carboxylic moiety can then be reacted with any of the basic dyestuffs set forth in the cited portion of Color Index, supra, thereby giving rise to a polymeric dyestuff.

A further illustration of a preformed polymer useful in the above process for the preparation of polymeric dyestuffs is the class of polymers derived by copolymerization of maleic anhydride and styrene or an alkyl vinyl ether. Such polymers have the recurring unit of the formula:

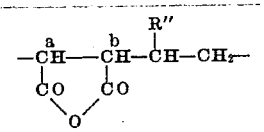

wherein $R''$ represents phenyl or lower-alkoxy. The term "lower-alkoxy" means alkoxy of from one to six carbon atoms, inclusive, such as methoxy, ethoxy, propoxy, butoxy, pentyloxy, hexyloxy, and isomeric forms thereof. Polymers having the above recurring unit can be hydrolyzed in the presence of aqueous mineral acid to convert the anhydride moieties in some, or all, the recurring units to carboxylic acid moieties which can then be reacted with any of the basic dyestuffs set forth above. Alternatively, a basic dyestuff containing a primary amino group can be reacted directly with a polymer having the recurring moiety set forth above to convert some, or all, of said recurring units to the corresponding half amides. The reaction is effected readily by bringing the reactants together in the presence of an inert solvent, as hereinafter exemplified, and heating the mixture within the range of about 50° to 100° C or higher. As will be seen, the anhydride ring in the polymer with the above recurring unit can open either of two ways during amidation. Thus, the ring can open so that the carbonamido group in the resulting amide is attached to carbon atom "$a$" leaving a free carboxy group attached to carbon atom "$b$." Alternatively, the ring can open in such a way that the carbonamido group is attached to carbon atom "$b$" and the free carboxy group is attached to carbon atom "$a$." All these various alternatives are within the scope of this disclosure.

In further illustration of the polymeric dyestuffs derived in accordance with method (b) there can be mentioned those in which the preformed polymer is one containing recurring hydroxyl groups in the chain or which can be readily modified chemically to provide recurring units in the chain. Such hydroxyl-containing polymers include:

i. polyvinyl alcohols (PVA). These polymers are well-known in the art, are available in a wide range of molecular weights within the above range, and can be prepared readily by hydrolysis of the corresponding polyvinylacetates; see, for example, Manufacture of Plastics, Edited by W. Mayo Smith, Reinhold, New York, 1964, page 256 et seq. The polyvinyl alcohols are characterized by the recurring unit:

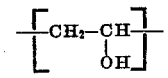

ii. Novolac resins. These resins are the products obtained by acid condensation of phenol, or a substituted phenol, with formaldehyde and are conventionally represented by the general formula:

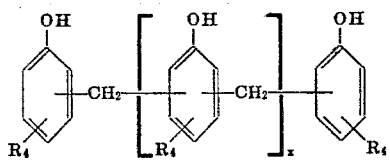

wherein $x$ has an average value of about 8 to about 12 and $R_4$ represents from 0 to 4 substituents selected from halogen and lower-alkyl groups. It is to be understood that the above formula is highly idealized and is an approximation only; see, for example, Carswell, "Phenoplasts," pages 29 to 35, Interscience, New York, 1947. A wide range of novolac resins of differing molecular weights within the above quoted range is available commercially, all of which are represented approximately by the above formula.

iii. Phenoxy resins characterized by the following molecular structure:

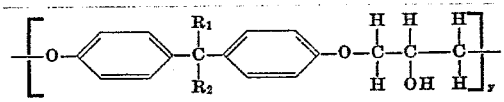

wherein $R_1$ and $R_2$ each represent lower-alkyl. These resins are obtained by reaction of the corresponding bisphenol and epichlorohydrin; see, for example, U.S. Pat. Nos. 3,277,051 and 3,401,139. They are available commercially in a molecular weight range of about 15,000 to about 60,000.

iv. Poly(hydroxydicyclopentadiene)ethers. These polymers are characterized by the following molecular structure:

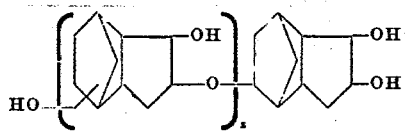

wherein $z$ has an average value within the range of about 10 to about 14. These resins are available commercially and are prepared by polymerization of the corresponding hydroxydicyclopentadiene oxide of the formula:

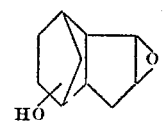

The above types of free hydroxyl containing polymers can then be esterified by reaction with the acid halides derived from the dyestuffs containing either carboxy or sulfonic acid groups. Alternatively, any of the basic dyestuffs set forth above which contain a free primary amino group can be converted to the corresponding isocyanates by phosgenation and the isocyanato-containing dyestuff is then reacted with the hydroxy containing polymer under conditions well-recognized in the art for the reaction between isocyanates and alcohols; see, for example, Saunders et al., Polyurethanes, Chemistry and Technology Part I, pages 228 to 230, Interscience Publishers, New York, 1964.

Illustrative of dyestuffs containing free carboxy and/or sulfonic acid groups which can be reacted with hydroxyl-containing polymers in the manner described above are those which are described and exemplified in Encyclopedia of Chemical Technology, Ed. Kirk-Othmer, Second Edition, 1963, Vol, 7 at page 521 et seq.

In still another illustration of the preparation of polymeric dyestuffs in accordance with method (b) discussed above, the preformed polymer is first modified by introduction of an azo coupler into two or more recurring units of the polymer and the modified polymer is reacted with a diazo dyestuff. The term "azo coupler" is one well-recognized in the art; illustratively the term is defined and exemplified in Encyclopedia of Chemical Technology, supra, Vol. 2, page 870 et seq. Illustratively, a polymeric dyestuff can be prepared in this manner by reacting a copolymer of maleic anhydride and styrene or an alkyl vinyl ether, as discussed above, with p-aminophenol in an amount sufficient to react with two or more of the anhydride moieties in the polymer. The reaction is accomplished readily by bringing the reactants together in the presence of an inert organic solvent, such as tetrahydrofuran, dioxane, dimethylsulfoxide, benzene, toluene, xylene, tetrahydronaphthalene and the like, and heating within the range of about 50° C to about 100° C or higher. The reaction taking place is illustrated as follows in regard to the manner of modification of the recurring unit of the starting polymer:

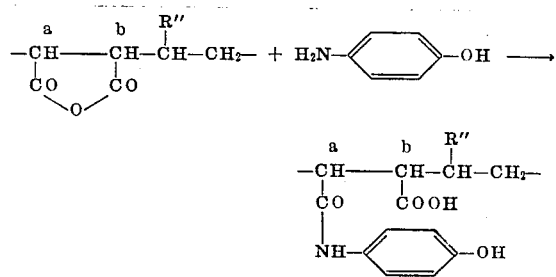

wherein R'' has the significance hereinbefore defined. If an excess of aminophenol is used the modified polymer will be obtained in the form of its salt with aminophenol and the free acid is liberated therefrom by acidification.

For the sake of simplicity the reaction shown above illustrates only one of the alternative ways in which the anhydride ring of the starting polymer can be opened during amidation. In the reaction scheme shown the starting anhydride ring opens in such a way that the resulting carbon-amido group is attached to carbon atom "a" and the free carboxy group is attached to carbon atom "b." However, the anhydride ring in the starting polymer can obviously open in the reverse manner so that the resulting carbon-amido group is attached to carbon atom "b" and the free carboxy group is attached to carbon atom "a." Indeed, the product obtained in the above reaction will have a largely random distribution of the two possible structures in the units in the chain of the final product. It is to be understood that the specification and claims of this application are now limited to polymers having only one of the two possible structures in the recurring unit but are intended to encompass all possible structures within the polymer chain.

The modified polymer containing free phenolic groups so obtained is then reacted with the appropriate diazonium salt in order to produce the desired polymeric dyestuff, for example, using the procedures and diazonium salts discussed and exemplified in Encyclopedia of Chemical Technology, supra. Any of the Azoic Diazo Components listed in Color Index, supra, Vol. 2, pages 2571–2612 can be used in the diazotization step.

In a further illustration of the above procedure, a polymeric dyestuff can be made directly from polymers, such as the novolac resins discussed above which contain free phenolic groups and which can therefore be reacted directly with diazonium salts without the need to use an azo coupler.

The substrates to which polymeric dyes can be bonded in accordance with the process of the invention include any high molecular weight material which contains a plurality of C—H bonds. Illustrative of such substrates are polyolefins such as polyethylene, polypropylene and the like, natural rubbers, butyl rubbers, SBR rubbers, polyisoprene, polybutadiene, polyacrylonitrile, ethylene-propylene terpolymers, copolymers of butadiene and acrylonitrile, copolymers of butadiene and methyl methacrylate and the like. The substrate can be employed in any of a wide variety of forms and configurations, i.e. in any of a wide variety of sizes and shapes of sheet, block, hollow, solid, and like forms, and the surface to which the polymeric dye is bonded need not necessarily be planar but can be of any contour or multiplicity of contours. In a particularly useful embodiment of the process of the invention, the substrate is in film form but the process of the invention is by no means limited to this particular embodiment and can be employed to bond the polymeric dye to the substrate no matter what particular shape, size or contour the latter may assume.

In carrying out the process of the invention, the substrate is first coated with a coating composition which comprises the polymeric dyestuff and the sulfonazide (I or II) in association with a suitable carrier. The latter usually takes the form of a volatile inert organic solvent which is a mutual solvent for the polymeric dyestuff and the sulfonazide (I or II). By "inert organic solvent" is meant an organic solvent which does not enter into reaction with the polymeric dyestuff or the sulfonazide (I or II). Any of the volatile inert organic solvents conventionally employed in the preparation of liquid coating compositions can be employed. Illustrative of such solvents are benzene, toluene, xylene, tetralin, dimethylformamide, tetrahydrofuran, methylene chloride, chloroform, butyl acetate, ethyl acetate, cellosolve acetate, acetone, cyclohexanone, methylethyl ketone and the like.

The amount of polymeric dyestuff employed in the coating compositions employed in the process of the invention can vary within wide limits and the exact amount employed in any particular instance is largely a matter of convenience. Thus, in general, the amount of polymeric dyestuff present in the said coating compositions can vary within the range of about 20 percent to about 100 percent by weight.

The amount of sulfonazide (I or II) present in the said coating compositions is advantageously within the range of about 1 percent to about 15 percent by weight, based on polymeric dyestuff present in said composition, and is preferably within the range of about 5 percent to about 10 percent by weight, based on polymeric dyestuff.

In addition to the polymeric dyestuff and the sulfonazide (I or II) there can also be present in the said coating compositions, if desired, any of the conventional pigments, flowing agents, other resins and like adjuvants commonly used in the coating art.

In applying the coating compositions to substrates, in accordance with the process of the invention, any of the conventional techniques of application, such as brushing, spraying, rolling, dipping and the like can be employed. The coating so produced on the substrate can be allowed to dry and cure in air, or alternatively, the coating can be subjected to the next step of the process of the invention without the drying and curing step having taken place.

In the second step of the process of the invention, the coated substrate is subjected to exposure to a source of radiation necessary to cause activation of the sulfonazide (I or II) and effect chemical bonding of the polymeric dyestuff to the substrate. Said source of radiation can be any of a wide variety of sources of thermal or actinic radiation. Illustratively, said radiation can be a generator of infrared or like thermal radiation, or a source of ultraviolet radiation. Preferably, particularly in the case of substrates which are subject to deformation and/or degradation upon exposure to heat, the source of radiation is a source which generates ultraviolet light of a wavelength within the range of about 250 nm to about 390 nm.

The time for which the coated substrate is exposed to the source of radiation in order to effect chemical bonding of the polymeric dyestuff to the substrate will vary considerably depending upon such factors as the thickness of the coating, and the particular polymeric dyestuff and sulfonazide employed in combination. The most appropriate time for which the coated substrate is to be exposed in any particular instance is one readily determined by a process of trial and error.

It is believed that the sequence of events which takes place when the coated substrate is exposed to the source of radiation is as follows. Two or all of the various sulfonazide moieties present in the sulfonazide are believed, firstly, to degrade with the formation of a nitrene radical. One of the nitrene radicals so generated attacks the C—H bonds in the substrate and a second nitrene radical in the same sulfonazide moiety attacks a C—H bond in the polymeric dyestuff thereby effecting the production of a chemical bond between said substrate and said polymeric dyestuff.

It is to be understood that the above suggestion is offered merely by way of explanation to assist the understanding of the process of the invention. It is not intended in any way to limit or to define the scope of the invention.

The irradiation step of the process of the invention can, if desired, be carried out "imagewise." That is to say, a negative of the image to be reproduced on the surface of the substrate is interposed between the coated substrate and the source of thermal or actinic radiation during the irradiation step. In this manner chemical bonding of the polymeric dye to the substrate is effected only in those portions of the coating which have been exposed to the radiation. The unexposed portions of the coating are then dissolved away by use of a suitable solvent, e.g. the same solvent used as carrier for the initial coating composition. The desired image is thus left chemically bonded to said substrate. The chemically bonded image so produced is extremely resistant to abrasion, exposure to solvent, weathering and like degradative forces, and represents a novel and efficient manner of solving a long standing problem, namely, the production of permanently bonded images on substrates to which such images could not previously be bonded.

As will be obvious to one skilled in the art, the bonding of images in the above manner can be adapted to the production of multicolored images by carrying out the process sequentially with two or more different polymeric dyestuffs. Thus a first image can be bonded on the substrate using the process described above. A second image is then bonded to the same substrate using a different polymeric dyestuff. If necessary, any further number of images using other polymeric dyestuffs can be bonded to the same substrate to produce the final multi-colored image on the substrate.

As will also be obvious to one skilled in the art, the process of the invention can be adapted to continuous procedures for the production of images on substrates such as continuous sheets and films. Illustratively, said sheet or film can be passed successively through (1) a zone in which the coating of polymeric dyestuff and sulfonazide (I or II) is applied, and the coated substrate is then passed through (2) a zone in which irradiation is carried out imagewise and finally said coated irradiated substrate is passed through (3) a washing zone in which unexposed coating is removed leaving the developed image on the substrate emerging from the washing zone.

The process of the invention has the advantage of broad applicability to a wide range of polymeric dyestuffs and substrates. It has the further advantage over processes in which monomeric dyestuffs and the like have been bonded to substrates by chemical crosslinking agents in that only the same amount of activating energy necessary to activate the crosslinker and bond a single monomer molecule to a substrate is utilized, in accordance with the process of the invention, to bond a polymer molecule having multiple dyestuff moieties pendant therefrom. The resulting dramatic increase in efficiency will be obvious to one skilled in the art. Further the sulfonazides (I or II) are free from any hazard in that, unlike other sulfonazides hitherto used as crosslinking agents, they show no tendency to explode or generate excessive quantities of gas (leading to bubbles in the coating) when activated, nor do they interfere in any way with the quality or stability of the bonded coating. The sulfonazides of formula (II) are particularly preferred for use in the process of the invention because the multiplicity of sulfonazide groups in the molecule give rise to very high orders of efficiency of utilization of the activating energy.

The sulfonazides of formula (I) which are employed in the preparation of the coating compositions of the invention, are readily prepared by reacting the appropriate alcohol $A(OH)_m$, wherein A and $m$ have the significance defined above, with at least a stoichiometric proportion, and preferably an excess, of the appropriate isocyanatobenzenesulfonyl chloride of the formula

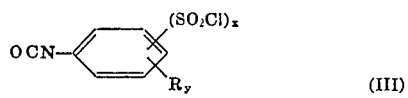
(III)

wherein R, $x$ and $y$ have the significance hereinbefore defined. The reaction is carried out under conditions well-recognized in the art for the condensation of hydroxyl and isocyanato groups. Advantageously, the reactants are brought together at ambient temperatures, i.e. of the order of 20° C to 25° C, in the presence of an inert organic solvent, as hereinbefore defined. The reaction mixture is preferably maintained below about 50° C, after the reactants have been brought together, in order to avoid reaction of the hydroxy groups in the alcohol with the sulfonyl halide moieties in the isocyanatobenzenesulfonyl chloride (III). Such reaction would clearly give rise to underside by-products.

If desired, the reaction between the alcohol and the sulfonyl halide (III) can be carried out in the presence of any of the catalysts well-recognized in the art as useful in promoting the reaction between NCO and OH groups.

The reaction of the alcohol and the sulfonyl halide (III) gives rise to an intermediate carbamate (IV) as follows:

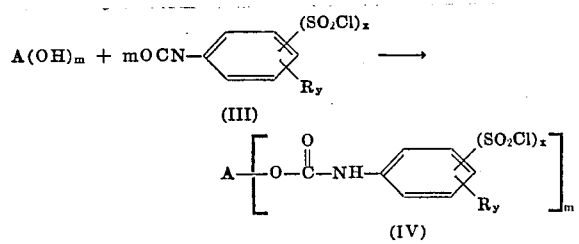

said carbamate (IV) can, if desired, be isolated from the reaction mixture, for example by evaporation of solvent, and purified, for example by recrystallization, before conversion to the desired sulfonazide (I). However, it is generally not necessary to isolate the compound (IV) prior to its conversion to the desired sulfonazide (I). Indeed, in most instances, the reaction product obtained in the reaction of the alcohol and the sulfonylchloride (III) can be employed without any further treatment in the conversion to the sulfonazide (I). Illustratively, the reaction product obtained in the above process, comprising the carbamate (IV) in solution in inert organic solvent, is treated, without any purification, with the appropriate amount of sodium azide, i.e. 1 molar proportion of sodium azide for each sulfonylchloride group in the carbamate (IV). The reaction with sodium azide is exothermic and is controlled, by cooling as required, to maintain the reaction temperature in the range of about 25° C to about 80° C. Sodium chloride is eliminated in the reaction and precipitated from the reaction mixture thereby serving as a ready guide to the progress of the reaction.

The desired sulfonazide (I) can be separated from the reaction mixture by conventional procedures. For example, the sodium chloride which has precipitated, is separated by filtration and the filtrate is evaporated to dryness. The sulfonazide (I) so isolated can be purified, if desired, by recrystallization, chromatography or like procedures, prior to being employed in the preparation of the novel coating compositions of the invention.

The isocyanatobenzenesulfonyl chlorides (III) which are employed as starting materials in the above synthesis are, for the most part, known in the art or can be prepared from readily available starting materials, e.g. by phosgenation of the corresponding sulfanilic acids using, for example, the procedure described by Alberino et al., T. Polymer Science, Vol. 5, pages 3212–13, 1967.

The sulfonazides of formula (II) are prepared by reacting the isocyanatobenzenesulfonyl chloride (III), directly with a substantially stoichiometric amount of sodium azide. The reactants are brought together, slowly, preferably in the presence of a polar solvent such as acetonitrile, dimethyl-formamide and the like, to control the exothermic reaction. Cessation of deposition of sodium chloride indicates completion of reaction. The desired sulfonazide (II) is isolated from the reaction mixture by filtering off the precipitated sodium chloride and evaporating the filtrate to dryness. Purification of the residue can be achieved by recrystallization or like procedures.

The following preparations and examples describe the manner and process of making and using the invention and set forth the best mode contemplated by the inventors of carrying out the invention but are not to be construed as limiting.

Preparation 1

To 1.95 gms (0.03 mole) of sodium azide in 50 ml of acetonitrile is added 6.5 gms (0.03 mole) 4-isocyanatobenzenesulfonyl chloride [prepared by a method described by Alberino et al. supra] in 30 ml of acetonitrile. The addition is done dropwise over a period of 12 minutes with constant stirring of the mixture.

The temperature range during the addition is between 16° and 25° C. As the reaction progresses, sodium chloride precipitates from the solution, resulting in a cloudy mixture. When the addition of sulfonylchloride is complete, the resulting mixture is filtered to remove the sodium chloride, and the filtrate evaporated, yielding 6.4gms (95.5 percent theoretical yield) of tris(p-azidosulfonylphenyl)isocyanurate in the form of white crystals which darken between 160° to 170° C and have a melting point over 300° C. The compound shows the characteristic azide absorption at 2,128 cm⁻¹ and a carbonyl absorption of 1,695 cm⁻¹ in its infrared spectrum which is in agreement with the assigned structure.

Analysis: Calculated for $C_{21}H_{12}N_{12}O_9S_3$: C, 37.50; H, 1.79

Found: C, 37.55; H, 1.84

Preparation 2

Using the procedure described in Preparation 1, but replacing the 4-isocyanatobenzenesulfonyl chloride by 3-isocyanatobenzenesulfonyl chloride there is obtained tris(m-azidosulfonylphenyl)isocyanurate.

Similarly, using the procedure described in Preparation 1, but replacing 4-isocyanatobenzenesulfonyl chloride by 2-chloro-4-isocyanatobenzenesulfonyl chloride, 4-isocyanato-3-methylbenzenesulfonyl chloride, 2,5-dichloro-4-isocyanatobenzensulfonyl chloride, or 5-isocyanatobenzene-1,3-di(sulfonylchloride), there are obtained:

tris(3-chloro-4-azidosulfonylpenyl)isocyanurate,
tris(2-methyl-4-azidosulfonylphenyl)isocyanurate,
tris(2,5-dicloro-4-azidosulfonylphenyl)isocyanate, and
tris[3,5-di(azodisulphonyl)phenyl]isocyanurate, respectively.

The 2-chloro-, 3-methyl-, and 2,5-dichloro-4-isocyanatobenzenesulfonyl chlorides and the 5-isocyanatobenzene-1,3-di(sulfonylchloride) employed in the above process are obtained by phosgenation of the corresponding known aminobenzenesulfonic acids using the procedure of Alberino, supra.

Preparation 3

To 3.1 gms (0.05 mole) mole) of ethylene glycol in 200 ml of acetonitrile is added a solution of 21.75 gms (0.1 mole) mole) of p-isocyanatobenzenesulfonyl chloride in 50 ml acetonitrile. The addition is accomplished over a period of about 5 minutes with stirring and cooling at circa 3° to 6° C. The resulting mixture is allowed to stand overnight, and then heated to reflux temperature, at which time 6.5 gms (0.1 mole) of sodium azide is added. The mixture so obtained is heated to 75° C and then allowed to cool to 50° C. Sodium chloride precipitate (5.9 gms) is filtered out. The filtrate is cooled and the solid which separates (5.6 gms; melting point 168° to 172° C) is isolated by filtration. Water is added to the cooled filtrate, yielding a further quantity (5.6 gms) of white crystals which are separated by filtration, washed and dried under vacuum. The total yield so obtained is 11.2 gms (45.2 percent theory) of crude ethylenebis(4-azidosulfonyl carbanilate) in the form of white crystals having melting point of 135° to 140° C. Upon recrystallization from acetonitrile, purified product with a melting point of 165° to 168° C is obtained.

Analysis: Calculated for $C_{16}H_{14}N_8O_8S_2$: C, 37.65 H, 2.75

Found: C, 38.45 H, 2.82

Using the above procedure, but replacing ethylene glycol by an equivalent amount of ethanol, propyl alcohol, hexanol, or octanol, and replacing p-isocyanatobenzenesulfonyl chloride by 5-isocyanatobenzene-1,3-di(sulfonyl chloride), there are obtained ethyl, propyl, hexyl, and octyl 3,5-di(azidosulfonyl)-carbanilates, respectively.

Preparation 2.76

To 2.76 gms (0.03 mole) of glycerol in 200 ml of acetonitrile is added, over a period of 12 minutes, a solution of 19.57 gms (0.09 mole) of p-isocyanatobenzenesulfonyl chloride in 50 ml acetonitrile. To the mixture is added 0.05 gms of triethylene diamine as catalyst. The resulting mixture is heated to reflux temperature (circa 80° C) for about 3 hours and then 3 gms of additional p-isocyanatobenzenesulfonyl chloride is added. The mixture is heated under reflux for an additional 3 hours and then cooled to room temperature. To the cooled mixture is added 7.15 gms (0.11 mole) sodium azide and the resulting mixture is stirred for about 1 hour. The precipitated sodium chloride is separated by filtration. The solvent is evaporated from the filtrate and the residue triturated in concentrated hydrochloric acid. The resultant white crystals are isolated by filtration, washed with water and dried, yielding 21.85 gms (96.9 percent theory) of 1,2,3-propylene tris(4-azidosulfonylcarbanilate) with melting point of 105° to 110° C.

Using the above procedure but replacing glycerol by an equivalent amount of erythritol, pentaerythritol, trimethylolpropane or mannitol, there are obtained erythritol tetra(4-azidosulfonylcarbanilate), pentraerythritol tetra(4-azidosulfonylcarbanilate), trimethylolpropane tri(4-azidosulfonylcarbanilate), and mannitol hexa(4-azidosulfonylcarbanilate), respectively.

EXAMPLE 1

A polymeric dyestuff was prepared by dissolving 1.56 gms of a poly(maleic anhydride co-methylvinyl ether) [average molecular weight 500,000; Gantrez 139] and 3.94 gms of phenylazoaniline (0.02 mole) in 50 ml of anhydrous tetrahydrofuran. The resulting mixture was heated under reflux for 3 hours, at the end of which time 25 ml of methanol was added and the mixture was heated for a further 12 hours under reflux. The resulting solution was cooled and an equal volume of carbon tetrachloride was added. The solid which separated was isolated by decantation, washed by trituration with carbon tetrachloride and then redissolved in 30 ml of acetone. The resulting solution contained a polymeric dyestuff in which the recurring units all had the following structure:

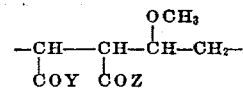

wherein one of Y and Z represents methoxy and the other represents

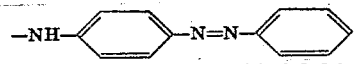

To the above solution was added 0.36 gm (10 percent by weight based on polymeric dyestuff)of N,N',N''tris(p-azidosulfonylphenyl)isocyanurate.

Using a high speed whirler, films were cast from the above solution on sheets of polyurethane elastomer, nylon, glass, polyethylene film and mylar. Each of the films was covered with a negative of a symmetrical pattern of 5 dots and exposed for 2 minutes to ultraviolet light from a mercury lamp (Hanovia Type SH), the plane of exposure being at a distance of 15 cm from the lamp. After exposure each film was developed by washing with acetone. In each case there was produced a sharp yellow-colored image which was unaffected by exposure to solvents and abrasive forces.

Using the above procedure, but reducing the amount of N,N',N''-tris(p-azidosulfonylphenyl)isocyanurate to 3 percent by weight based on polymeric dyestuff, there were obtained corresponding chemically bonded yellow images on the various substrates.

Similarly, using the above procedure, but replacing the N,N',N''-tris(p-azidosulfonylphenyl)isocyanurate by an equal amount by weight of glycerol tris(p-azidosulfonylcarbanilate), erythritol tetra(4-azidosulfonylcarbanilate), pentaerythritol tetra(4-azidosulfonylcarbanilate), trimethylolpropane tri(4-azidosulfonylcarbanilate), mannitol hexa(4-azidosulfonylcarbanilate), tris(3-chloro-4-azidosulfonylphenyl)isocyanurate, tris(2-methyl-4-azidosulfonylphenyl)isocyanurate, or tris-(2,5-dichloro-4-azidosulfonylphenyl)isocyanurate, there are obtained corresponding chemically bonded yellow images on the various substrates.

EXAMPLE 2

A polymeric dyestuff was obtained by dissolving 3.14 gms of a poly(maleic anhydride co-methylvinyl ether) [average molecular weight 250,000; Gantrez AN 119] and 1.26 gms (0.004 mole) of 4-nitro-4'-(N-2-hydroxyethyl)ethylamino-azobenzene (Palacet Scarlet B) in 50 ml of anhydrous pyridine. The resulting solution was heated to 80° C for 16 hours. The final solution was cooled and excess carbon tetrachloride was added. The material which separated was isolated by decantation and dissolved in a mixture of equal volumes of water and acetone. The solution was acidified by the addition of 100 ml of 5N hydrochloric acid. The red polymer which separated was isolated by decantation, washed with water, dried in air and dissolved in 50 ml of acetone. The resulting solution contained a polymeric dyestuff in which 1 out of every 2.5 recurring units had the following structure:

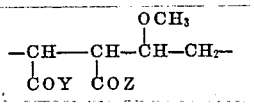

wherein one of Y and Z represents hydroxyl and the other represents

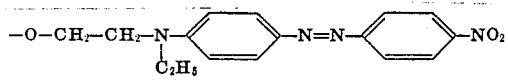

To 10 ml of the above solution was added 0.088 gm (10 percent by weight based on polymeric dyestuff) of N,N',N''tris(p-azidosulfonylphenyl)isocyanurate. A film was cast from said solution on a sheet of polyethylene film using a high speed whirler. The film-coated sheet was covered with a negative of a pattern of dots and exposed for 2 minutes to ultraviolet light from a mercury lamp (Hanovia Type SH), the plane of exposure being at a distance of 15 cm from the lamp. After exposure the image was developed by immersing the polyethylene sheet in acetone. There was thus obtained a sharp red image which provided highly resistant to attack by a variety of solvents and by abrasive forces.

Similarly, using the above procedure, but replacing the 4-nitro-4'-(N-2-hydroxyethyl)ethylamino-azobenzene by equivalent amounts of Naphthol AS (2-hydroxy-3-naphthoicanilide, Para Red (p-nitrobenzeneazo-β-naphthol), Natural Orange 6 (2-hydroxy-1,4-naphthoquinone), Natural Brown 7 -(N-2-hydroxyethyl)ethylamino-azo or Disperse Red 13 [2-chloro-4-nitro-4'-(N-2-hydroxyethyl)ethylamino-azo benzene], there are obtained corresponding polymeric dyestuffs which are used in the preparation of chemically bonded images on substrates using the procedure described above.

EXAMPLE 3

Using the procedure described in EXAMPLE 1 but replacing phenylazoaniline by an equivalent amount of 4-amino-4'-nitroazobenzene (Disperse Orange 3), there is obtained a polymeric dyestuff in which the recurring unit has the structure:

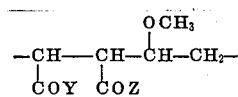

wherein one of Y and Z represents methoxy and the other represents

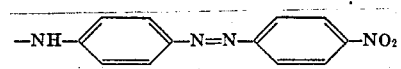

The polymeric dyestuff so obtained is then employed in the preparation of images on polyethylene film using the procedure described in EXAMPLE 1.

Similarly, using the procedure described in EXAMPLE 1 but replacing the phenylazoaniline by an equivalent amount of 4-amino-4'-dimethylaminoazobenzene (Disperse Black 7), 1-methyl-aminoanthraquinone (Disperse Red 9), 1-(p-chloroanilino)naphthoquinone-1,4 (Vat Red 33), 1-amino-2-methylanthraquinone (Disperse Orange 11) or indamine (Phenylene Blue), there are obtained the corresponding dyestuffs from which chemically bonded colored images are produced on polyethylene sheet using the procedure described in EXAMPLE 1.

EXAMPLE 5

A mixture of 3.5 gms of a poly(maleic anhydride comethyl vinyl ether) [average molecular weight 250,000; Gantrez AN 119] and 2.18 gms (0.02 mole) of p-aminophenol in 50 ml of anhydrous tetrahydrofuran was heated under reflux for 20 hours. The precipitate which separated as isolated by decantation of the supernatant liquor and was dissolved in 50 ml of methanol. To the resulting solution was added 100 ml of 5N hydrochloric acid. The solid which precipitated was isolated by decantation and dissolved in 50 ml of acetone. The solution so obtained contained a polymer in which 1 of approximately every 2 recurring units had been modified and had the structure:

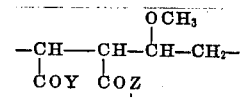

wherein one of Y and Z represents hydroxyl and the other represents

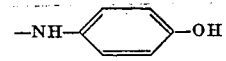

To the acetone solution of polymer so obtained was added slowly, with stirring and cooling in an ice-bath, a solution obtained by diazotizing a solution of 4.84 gms (0.02 mole) of p-phenylazoaniline in 20 ml of 2N hydrochloric acid. The dark red solid which separated was isolated by decantation, triturated with water and dissolved in 50 ml of acetone. There was thus obtained a solution of a polymeric dyestuff in which 1 of approximately every 2 recurring units had the structure:

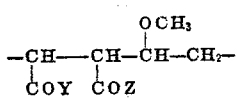

wherein one of Y and Z represents hydroxyl and the other represents

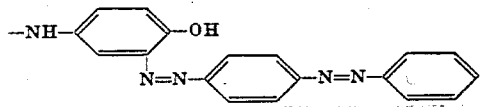

The above acetone solution was then employed to produce a chemically bonded orange-colored image on a polymethylene film substrate using the procedure described in EXAMPLE 1 for chemically bonding the polymeric dye therein disclosed to various substrate.

We claim:

1. A process for chemically bonding a polymeric dyestuff to a substrate containing a linear polyamide, linearpoly-ester or polyolefin which process comprises the steps of:
   a. applying to said substrate a coating comprising a polymeric dyestuff and from 1 percent to 15 percent by weight, based on said polymeric dyestuff, of a sulfonazide selected from the class consisting of sulfonazides having the formulas:

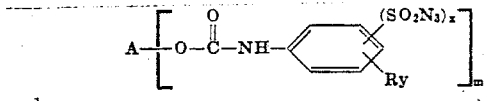

and

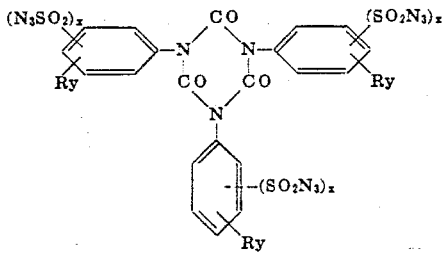

wherein A is the residue of a saturated aliphatic alcohol having m hydroxyl groups, wherein $m$ is an integer from 2 to 6, and a molecular weight less than 300 said saturated aliphatic alcohol being selected from the group consisting of alkylene diols from 2 to 6 carbon atoms, inclusive, hexane-1,2,3-triol, glycerol, trimethylolethane, trimethylolpropane, erythritol, pentaerythritol, mannitol and glucose, R is selected from the class consisting of lower-alkyl and halogen, $x$ is an integer from 1 to 2, $y$ is an integer from 0 to 2, wherein the sum of $x + y$ is not greater than 3, and wherein $m$ is at least 2 when $x$ is 1 in the first formula above, the $SO_2N_3$ groups are attached at positions 3, 4, or 5 and R is attached in any otherwise unsubstituted position, and wherein at least one of positions 3, 4, or 5 in each benzene ring is unsubstituted; and
   b. exposing said coated substrate to a source of irradiation necessary to activate said sulfonazide and thereby effect chemical bonding of said polymeric dye to said substrate.

2. The process of claim 1 wherein said sulfonazide is ethylenebis(p-azidosulfonylcarbanilate).

3. The process of claim 1 wherein said sulfonazide is glycerol tris(p-azidosulfonylcarbanilate).

4. The process of claim 1 wherein said sulfonazide is N,N',N-''-tris(p-azidosulfonylphenyl)isocyanurate.

5. The process of claim 1 wherein the polymeric dyestuff is a poly(maleic anhydride-co-methylvinyl ether) which has been modified by reaction with a basic dyestuff containing a free amino group.

6. The process of claim 1 wherein the substrate containing a plurality of C—H bonds is polyethylene.

7. A process of chemically bonding a polymeric dyestuff to a polyolefin which process comprises the steps of:
   a. applying to said polyolefin a coating comprising a polymeric dyestuff and from 1 percent to 15 percent by weight, based on said polymeric dyestuff, of a sulfonazide selected from the class consisting of sulfonazides having the formulas:

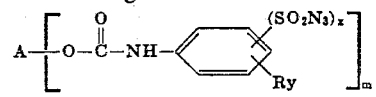

and

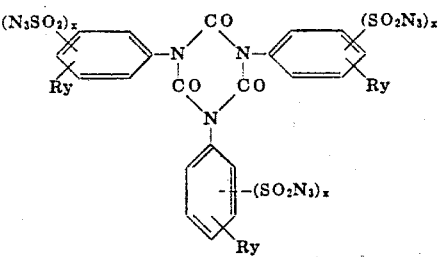

wherein A is the residue of a saturated aliphatic alcohol having m hydroxyl groups, wherein $m$ is an integer from 2 to 6, and a molecular weight less than 300, said saturated aliphatic alcohol being selected from the group consisting of alkylene diols from 2 to 6 carbon atoms, inclusive, hexane-1,2,3-triol, glycerol, trimethylolethane, trimethylolpropane, erythritol, pentaerythritol, mannitol and glucose, R is selected from the class consisting of lower-alkyl and halogen, $x$ is an integer from 1 to 2, $y$ is an integer from 0 to 2, provided that the sum of $x + y$ is not greater than 3, and further provided that $m$ is at least 2 when $x$ is 1, in the first formula above, the $SO_2N_3$ groups are attached at positions 3, 4, or 5 and R is attached in any otherwise unsubstituted position, provided that at least one of positions 3, 4, or 5 in each benzene ring is unsubstituted; and
   b. exposing said coated polyolefin to a source of irradiation necessary to activate said sulfonazide, and thereby effect chemical bonding of said polymeric dyestuff to said polyolefin.

8. The process of claim 7 wherein the irradiation of the coated polyolefin is carried out imagewise.

9. The process of claim 7 wherein said sulfonazide is ethylene-bis(p-azidosulfonylcarbanilate).

10. The process of claim 7 wherein said sulfonazide is glycerol tris(p-azidosulfonylcarbanilate).

11. The process of claim 7 wherein said sulfonazide is N,N',N''-tris(p-azidosulfonylphenyl)isocynaurate. - tris(p-azidosulfonylphenyl)isocyanurate.

* * * * *